United States Patent [19]

Robinson et al.

[11] Patent Number: 5,586,913
[45] Date of Patent: Dec. 24, 1996

[54] S TO B WATTHOUR METER SOCKET ADAPTER

[75] Inventors: Darrell Robinson, Highland Township; Karl Loehr, Novi; Allen V. Pruehs, Howell; Robert O. Learmont, Walled Lake, all of Mich.

[73] Assignee: Ekstrom Industries, Inc., Farmington Hills, Mich.

[21] Appl. No.: 371,015

[22] Filed: Jan. 11, 1995

Related U.S. Application Data

[63] Continuation of Ser. No. 334,562, Nov. 4, 1994, which is a continuation-in-part of Ser. No. 215,915, Mar. 22, 1994, abandoned, and Ser. No. 216,261, Mar. 22, 1994, abandoned.

[51] Int. Cl.⁶ ...................................................... H01R 25/00
[52] U.S. Cl. ............................ 439/638; 439/517; 361/640
[58] Field of Search ............................ 439/517, 638–654, 439/508; 361/370, 373

[56] References Cited

U.S. PATENT DOCUMENTS

| | | |
|---|---|---|
| Re. 34,531 | 2/1994 | Bell et al. . |
| 2,030,522 | 2/1936 | Johansson . |
| 3,061,763 | 10/1962 | Ekstrom . |
| 3,221,216 | 11/1965 | Kobryner . |
| 4,117,530 | 9/1978 | Reed et al. . |
| 5,033,973 | 7/1991 | Pruehs et al. . |
| 5,088,004 | 2/1992 | Howell . |
| 5,145,403 | 9/1992 | Schaffert et al. . |
| 5,181,166 | 1/1993 | Howell . |
| 5,207,595 | 5/1993 | Learmont et al. . |

OTHER PUBLICATIONS

MDK, Die Miniatur–Doppel–Flachfeder–Systeme–Leaf Spring Connector Systems, Grote & Hartman (No Date Available).
Machine Design, Jan. 11, 1990, pp. 117–119, Automotive Technology.
Scientific Atlanta, Service Reconnect Device Series SRD–S1900 Jan. 1992.

*Primary Examiner*—David L. Pirlot
*Attorney, Agent, or Firm*—Young & Basile, PC

[57] ABSTRACT

A watthour meter socket adapter includes a plurality of rigid electrical conductors non-attachedly disposed in a housing. An electrical contact is mounted on a first end of each electrical conductor and is positioned within the housing for receiving a blade terminal of a watthour meter therein. A second end of each electrical conductor extends externally of the housing for insertion into terminals mounted in a watthour meter socket. An insulating sleeve mounted in the housing surrounds the portion of the electrical conductors extending externally of the housing, with the second ends of the electrical conductors extending outward from the sleeve. An electrically insulating plate is mounted within the housing spaced from a base of the housing. Apertures formed in the insulating plate receive individual electrical contacts on the conductors for positioning the electrical contacts and the electrical conductors within the housing to receive a blade terminal of a watthour meter.

32 Claims, 7 Drawing Sheets

PRIOR ART

S TO B WATTHOUR METER SOCKET ADAPTER

CROSS REFERENCE TO CO-PENDING APPLICATIONS

This application is a continuation of U.S. patent application Ser. No. 08/334,562, filed Nov. 4, 1994, a continuation-in-part of U.S. patent application Ser. No. 08/215,915, filed Mar. 22, 1994 now abandoned, and a continuation-in-part of U.S. patent application Ser. No. 08/216,261, filed Mar. 22 1994 now abandoned, all assigned to the same assignee as the present application.

BACKGROUND OF THE INVENTION

1. Field of the Invention

The present invention relates, in general, to electrical watthour meters and, more specifically to watthour meter socket adapters.

2. Description of the Art

In the electric utility industry, watthour meters are commonly employed to measure electrical power consumption at a residential or commercial building establishment. A cabinet is typically mounted on an outside wall of the residence or building and contains a meter socket having pairs of line and load terminals which are connected to electric power line conductors extending from the utility power network and electric load conductors connected to the residential or building establishment power distribution network. The line and load terminals are connected to blade terminals extending outward from the base of a watthour meter to complete an electric circuit through the watthour meter between the line and load terminals mounted in the socket for the measurement of electrical power consumption.

A "B" type watthour meter is provided with a Plurality of rigid, generally tubular conductors which extend downward and outward from the meter housing and are insertable into and fixedly attachable to the terminals in the watthour meter socket.

Figure 1:
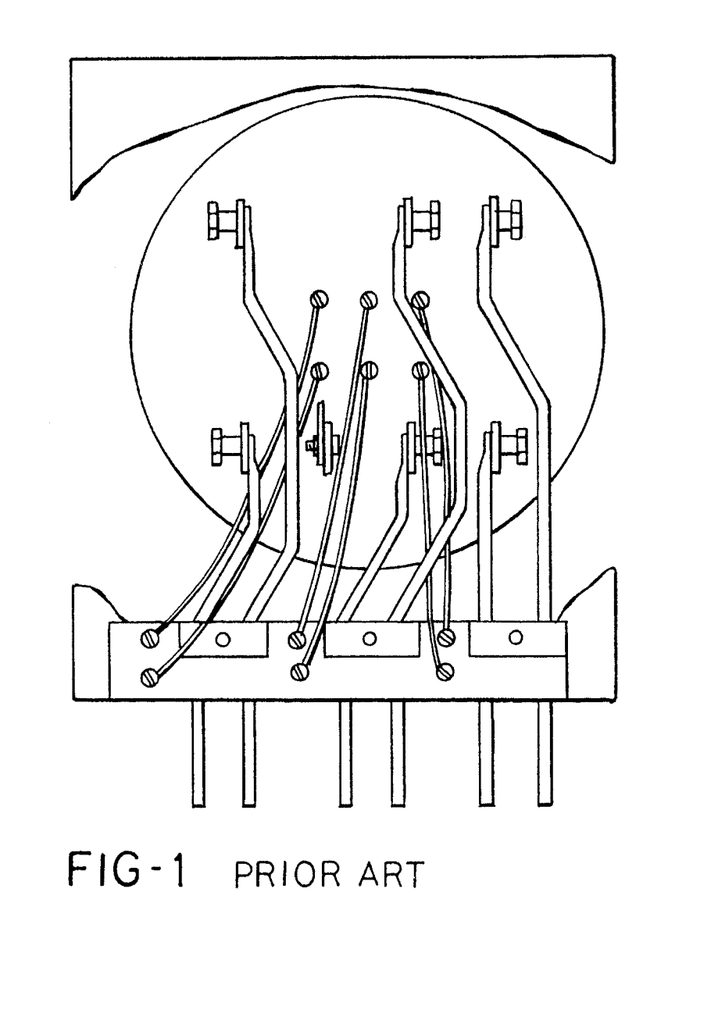
FIG. 1 is a front elevational view of a first prior art S to B type watthour meter-socket conductor mounting arrangement.

S-type, socket-type, plug-in watthour meters have replaced older A base bottom connected meters which were formed of a single piece housing in which the watthour meter was fixedly mounted along with compression terminals which provide connection to the utility power lines and the building load distribution network. An S-type watthour meter also has outwardly extending blade terminals. In order to mount such an "S" type meter in an S to B watthour meter socket, solid tubular conductors preformed to the desired shape were bolted directly to the watthour meter blade terminals as shown in FIG. 1. The outer ends of the tubular conductors were then inserted into circular or rectangular shaped openings in the watthour meter socket terminals and fastened in place to complete an electrical circuit with electric power line and load conductors which were also connected to the watthour meter socket terminals. Potential wires were then connected to the watthour meter and to terminals mounted on a plate attached to the tubular conductors.

Figure 2:
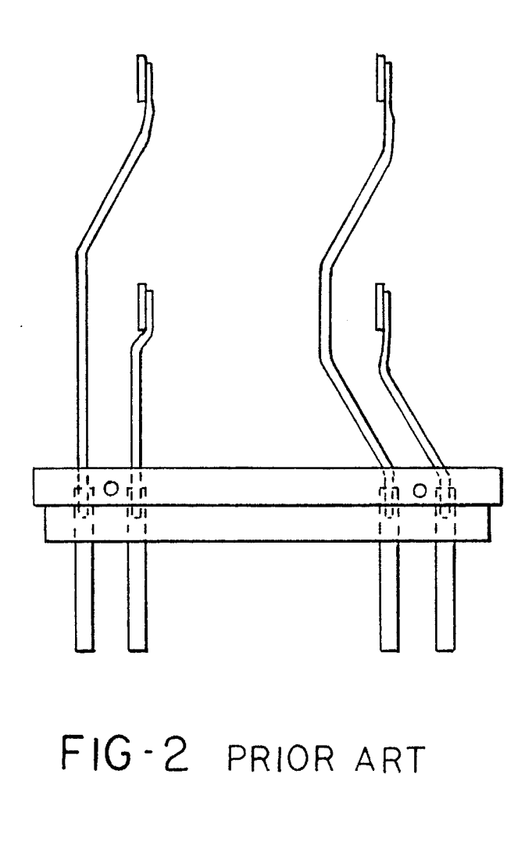
FIG. 2 is a front elevational view of a second prior art S to B watthour meter-socket conductor mounting arrangement.

The next advance in S to B type watthour meter construction was the mounting of the tubular conductors in a rigid frame as shown in FIG. 2. Stranded wire conductors were crimped at one end to the tubular conductors and then extended to a bolted connection with the appropriate blade terminals on the back of the watthour meter.

Both of these prior art S to B type watthour meter constructions require extensive labor to connect each individual conductor to the watthour meter and/or to crimped the stranded conductors to the tubular conductors. Additional labor was also necessary to attach the potential wires to the watthour meter and to the terminals on the frame.

Figure 3:
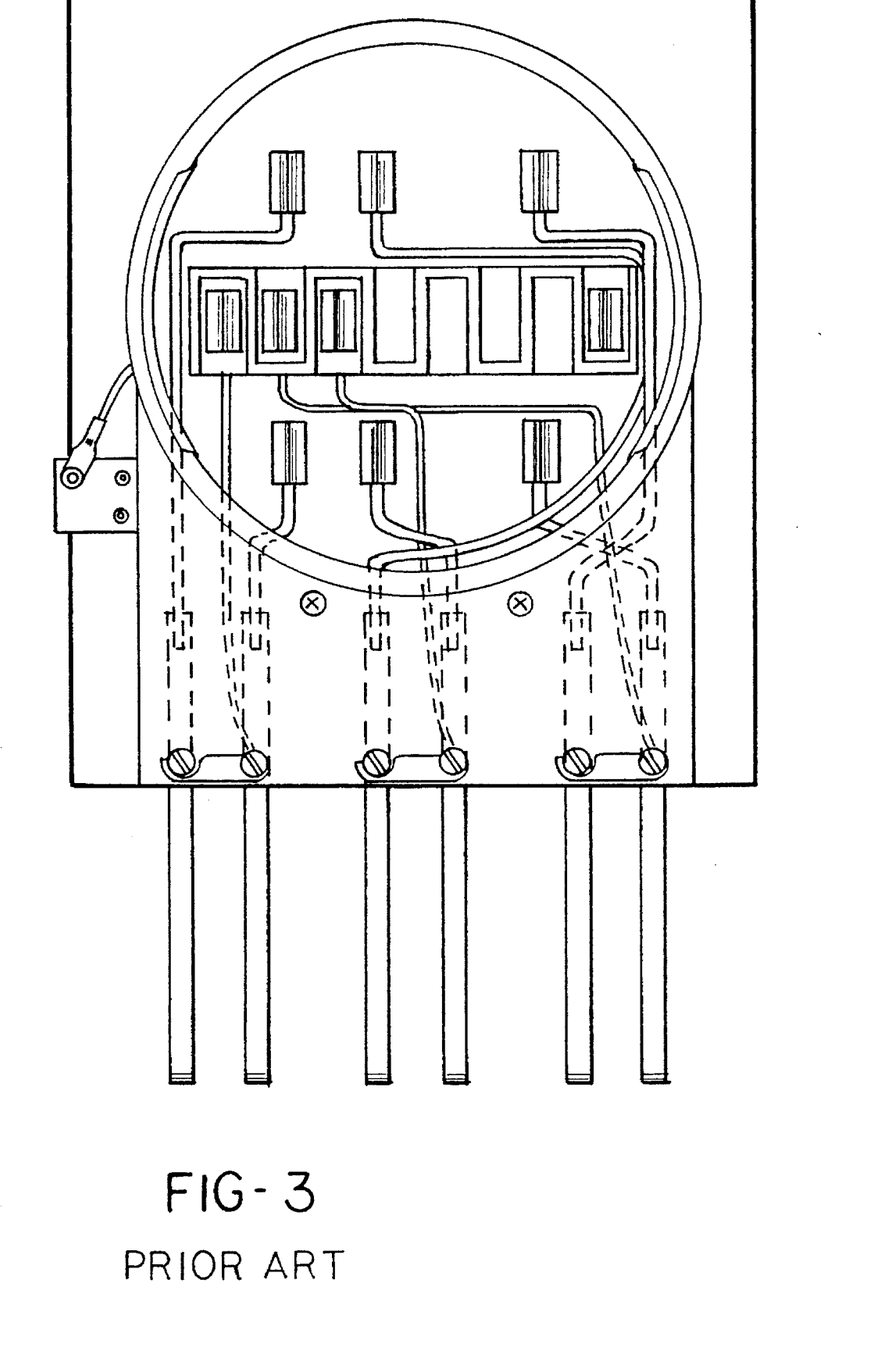
FIG. 3 is a front elevational view of a prior art S to B type watthour meter socket adapter.

Next, FIG. 3, depicts the next development of an S to B watthour meter adapter. A CT rated adapter, as shown, but the adapter could also have been constructed as a self-contained adapter. In this prior art construction, hollow tubular conductors were crimped to stranded wire conductors. The stranded wire conductors were in turn connected to jaw contacts fixedly mounted in a watthour meter socket adapter housing at standard mounting positions to receive the watthour meter blade terminals in a snap-in connection. Potential wires from potential jaw terminals mounted in the watthour meter socket adapter housing were run to disconnect links on the front of a terminal block formed on the socket adapter housing. The tubular conductors pass through bores machined in an insulating block made polyvinyl chloride and extend downward from the annular rim of the socket adapter. A ground connect pin is mounted by means of a bracket on a back plate attached to the socket adapter housing. The pin is connected by a conductor to the ground jaw of the socket adapter and receives a plug-in connector not shown, which is in turn connected to ground in the watthour meter socket.

However, as with the first two above-described prior art constructions, the S to B watthour meter socket adapter shown in FIG. 3 still had a high manufacturing cost due to the extensive labor required to connect each individual stranded wire conductor to a tubular conductor and to a jaw contact. Further, the stranded wire conductors provided only a limited current carrying capability. Special potential wires and extensive labor were also necessary to bring the potential wires out to the front of the terminal block to enable testing of the watthour meter. In addition, extra labor and cost are involved in mounting the ground pin externally from the adapter housing.

It is estimated that approximately one quarter million B type watthour meter sockets are currently in use. However, S to B watthour meters are no longer being made and the tooling for such S to B watthour meters no longer exists. Thus, while electric utilities are replacing S to B watthour meters, the utilities do not desire to replace the B-type watthour meter sockets due to the high cost of the sockets.

Thus, it would be desirable to provide an S to B watthour meter socket adapter which overcomes the above-described deficiencies in previously devised S to B watthour meter socket adapters. It would also be desirable to provide an S to B watthour meter socket adapter which has a higher current carrying capability than previously devised S to B type watthour meter socket adapters. It would also be desirable to provide an S to B watthour meter socket adapter which enables a watthour meter to be tested by standard meter test procedures without extensive labor or construction costs. Finally, it would be desirable to provide an S to B watthour meter socket adapter which has a lower manufacturing cost due to the complete construction and conductor connections of the watthour meter socket adapter by the socket adapter manufacturer.

SUMMARY OF THE INVENTION

The present invention is a watthour meter socket adapter particularly devised for use as an S to B socket adapter for mounting an S-type watthour meter in a B type watthour meter socket.

The watthour meter socket adapter of the present invention includes a housing having a watthour meter receiving portion formed of a base and an annular side wall extending from the base and terminating in a watthour meter mounting flange. A plurality of rigid electrical conductors are disposed within the housing. Each electrical conductor has first and second ends. An electrical contact is mounted on the first end of each electrical conductor for receiving a blade terminal of a watthour meter in a snap-in connection. The second end of each electrical conductor extends externally of the housing for electrical connection to a terminal mounted in a watthour meter socket.

Preferably, each electrical conductor has a polygonal cross section, with a rectangular cross section being preferred. More preferably, each electrical conductor is formed with a generally rectangular cross section, bus-bar configuration along its entire length. The second ends of each conductor are stepped down from the nominal maximum dimension of the conductors to fit within the standard terminals in the watthour meter socket.

An aperture is formed in the side wall of the housing, with the second ends of the electrical conductors passing through the aperture. An electrically insulating sleeve is mounted in the housing and has an end portion extending through the aperture in the side wall externally of the housing. Apertures are formed in the sleeve for receiving the second ends of individual electrical conductors therethrough.

Means are provided for positioning the contacts on each electrical conductor in a standard watthour meter mounting position within the housing of the watthour meter socket adapter for receiving the blade terminals of a watthour meter. The positioning means preferably includes an electrically insulating plate mounted in the housing and spaced from the base to define a cavity between the base and the insulating plate in which the electrical conductors are non-attachedly disposed. A plurality of apertures are formed in the insulating plate, with each aperture receiving an outer end portion of a contact of an electrical conductor therethrough.

A hollow receptacle may be formed on the insulating plate to surround each jaw contact. An aperture in each receptacle allows insertion of a watthour meter blade terminal into the jaw contact within each receptacle.

A ground connect pin is mounted in and is disposed in electrical contact with one of the ground surge plates. An outer end of the pin is extends externally of the socket adapter housing for receiving a plug-on connector attached to ground in the meter socket.

The watthour meter socket adapter of the present invention provides significant advantages over previously devised S to B watthour meter socket adapters. The present socket adapter uniquely enables the now standard S-type watthour meter to be mounted in a B-type watthour meter socket without modification to the watthour meter socket. The rigid, bus-bar type electrical conductors employed in the present watthour meter socket adapter provide higher current carrying capacity as compared to previously devised S to B type watthour meter socket adapters due to the large cross section of each conductor extending from the stepped down second end which is sized to fit within the existing terminals in the watthour meter socket. Further, since the electrical conductors are non-attachedly disposed within the housing of the watthour meter socket adapter, the watthour meter socket adapter may be manufactured less expensively than previously devised S to B watthour meter socket adapters since the extensive labor required to fixedly mount each conductor within the housing of the socket adapter and the close manufacturing tolerances associated therewith and/or the labor required to connect each conductor to the blade terminals of a watthour meter are reduced or eliminated. Since the conductors and jaw contacts freely float within the housing, the jaw contacts are self-alignable with the watthour meter blade terminals for a secure, even contact and a maximum current carrying capacity. The watthour meter socket adapter of the present invention enables a watthour meter to be tested separate from the socket by use of standard test procedures. Finally, the mounting of the ground pin directly on one of the ground surge plates simplifies the insulation of the ground pin and eliminates the separate mounting bracket and ground conductor employed in prior art adapters.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 4:
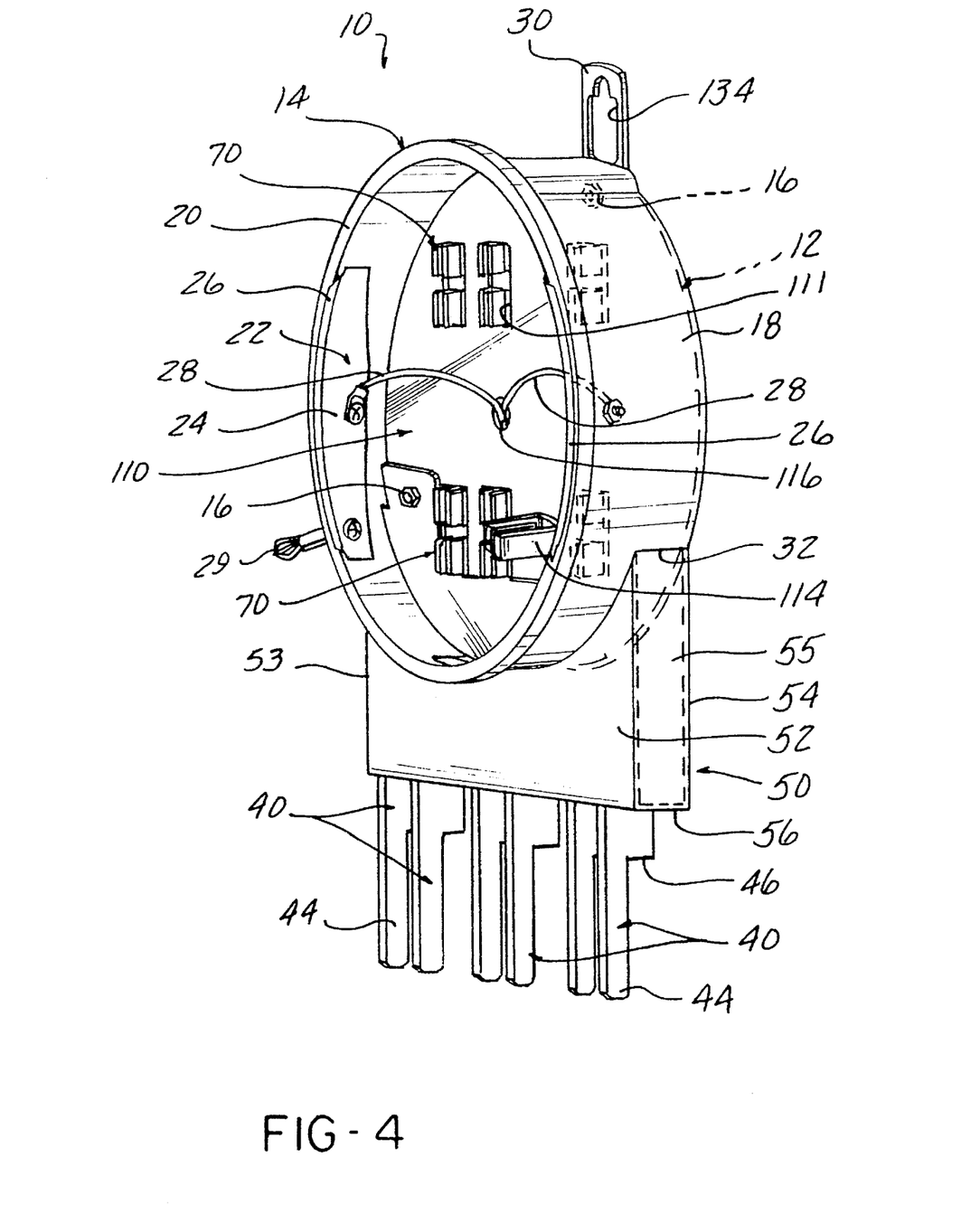
FIG. 4 is a perspective view of an S to B watthour meter socket adapter constructed in accordance with the teachings of the present invention.
Figure 5:
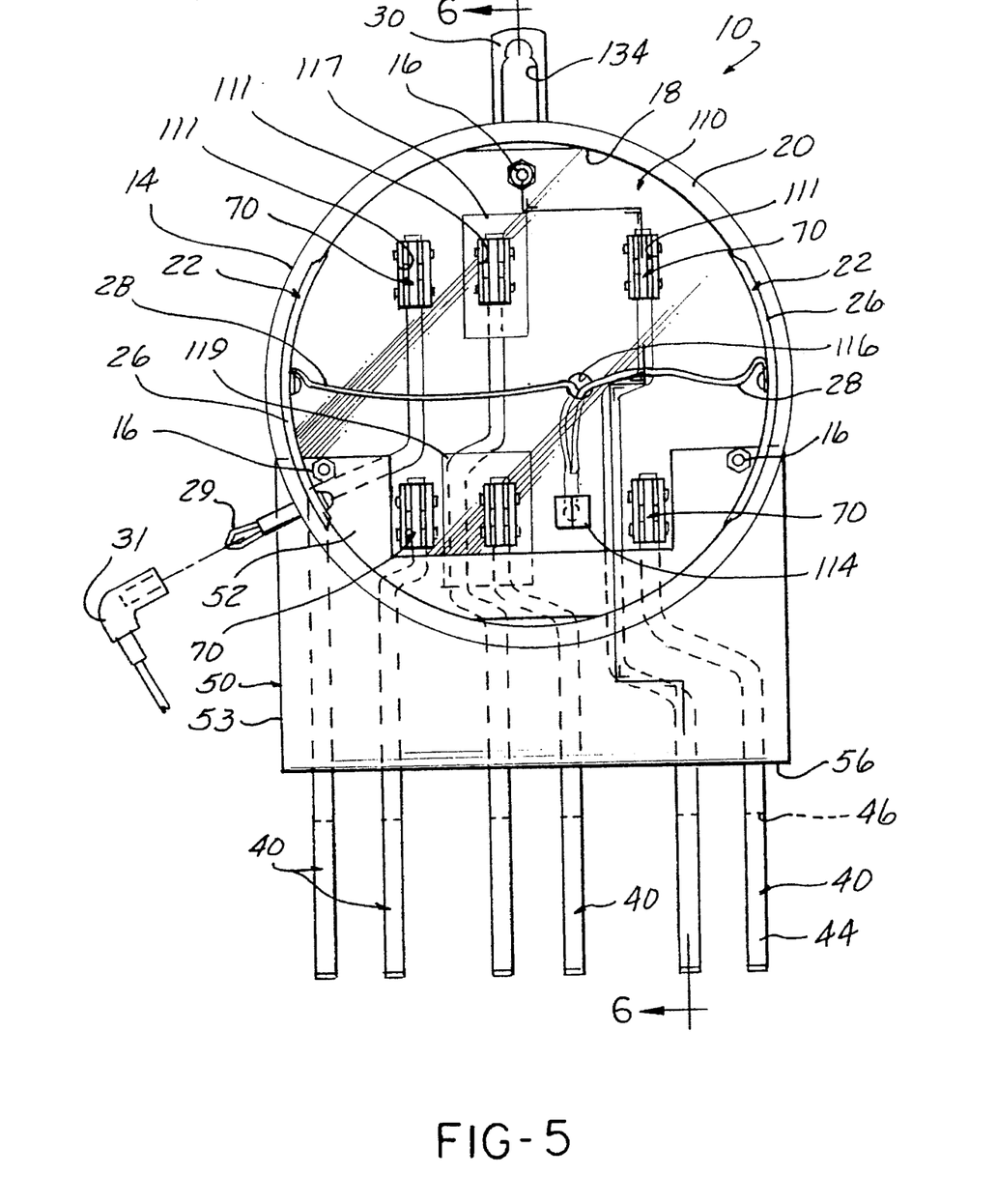
FIG. 5 is a front elevational view of the S to B watthour meter socket adapter shown in FIG. 4.

Referring now to the drawing, and to FIGS. 4 and 5 in particular, there is depicted an S to B watthour meter socket adapter 10 constructed in accordance with the teachings of the present invention. The socket adapter 10 is of generally conventional construction in that it includes a housing formed of a base 12 and a shell 14. The base 12 and shell 14 are formed of an electrically insulating material, such as a suitable plastic, and may be constructed as a single piece, molded, unitary part, or as two separate pieces joined together by means of fasteners extending through the base 12 and the shell 14.

The shell 14 includes an annular side wall 18 which defines a watthour meter receiving aperture. A radially enlarged mounting flange 20 is formed on an outer edge of the annular side wall 18 and forms a mounting surface for receiving a mating mounting flange on a watthour meter.

A pair of ground surge plates 22 are mounted in the shell 14. Each ground surge plate 22 includes an inner depending leg 24 which extends along the annular side wall 18 of the shell 14. A fastener is mounted through the leg 24 and the side wall 18 to attach the ground surge plate 22 to the shell 14. An upper end flange 26 is disposed in registry with the mounting flange 20 on the shell 14. Ground conductors 28 are electrically connected to each depending leg 24 of the ground surge plates 22 and to an internal ground connection within the housing 12 of the S to B watthour meter socket adapter 10 as described hereafter. The right ground conductor 28 in the orientation shown in FIGS. 4 and 5 is attached to the mounting fastener extending through a central portion of the leg 24 of the right ground surge plate 22. The left ground conductor 28 could also be connected to the fastener attaching the left ground surge plate 22 to the shell 14. However, in an exemplary embodiment, the left ground conductor 28 ends in a terminal through which a headed fastener 27 extends.

Figure 6:
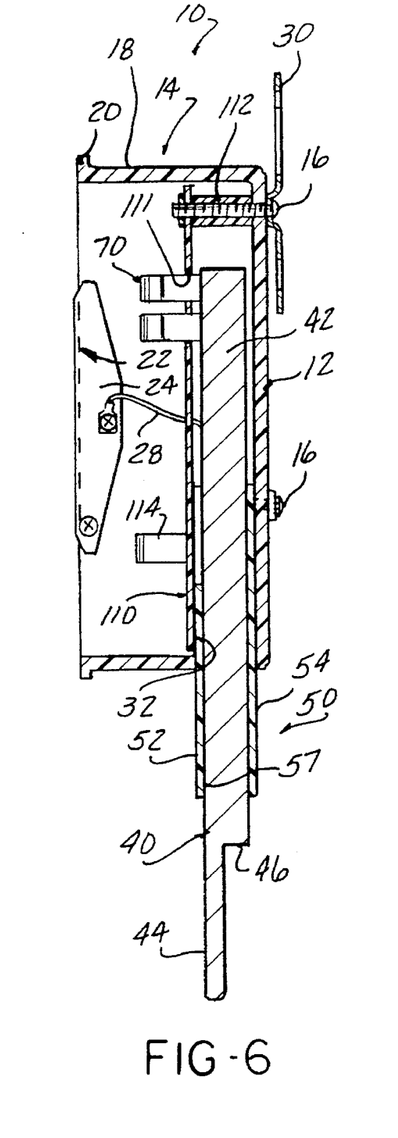
FIG. 6 is a cross sectional view generally taken along line 6—6 in FIG. 5.

The fastener 27 extends through the side wall 18 of the shell 14 into a conductive pin 29 which extends outward through the side wall 18. The pin 29 provides an external ground connection to a plug-type connector 31, FIG. 5, which is connected to ground in the watthour meter socket. The fastener 27 is positioned such that the head of the fastener 27 or the terminal mounted on the end of the left ground conductor 28 and receiving the fastener 27 electrically contacts the left ground surge plate 22. As shown in FIGS. 4, 5 and 6, the head of the fastener 27 contacts the lower edge of the ground surge plate 22 to electrically connect the left ground conductor 28 to the left ground surge plate 22. Alternately, the fastener 27 could extend directly through the leg 24 of the left ground surge plate 22. In this configuration, the left ground conductor 28 could be connected to the fastener 27 or to the mounting fastener located centrally in the leg 24 of the left ground surge plate 22.

A hanger 30 is mounted to the base 12 by one of a plurality of fasteners 16 and provides a suitable attachment for mounting the socket adapter 10 in a watthour meter socket, as described hereafter.

An aperture 32 having a generally arcuate shape is formed at a bottom portion of the annular side wall 18 of the shell 14 adjacent to the base 12. The purpose of the aperture 32 will also be described in greater detail hereafter.

Figure 7:
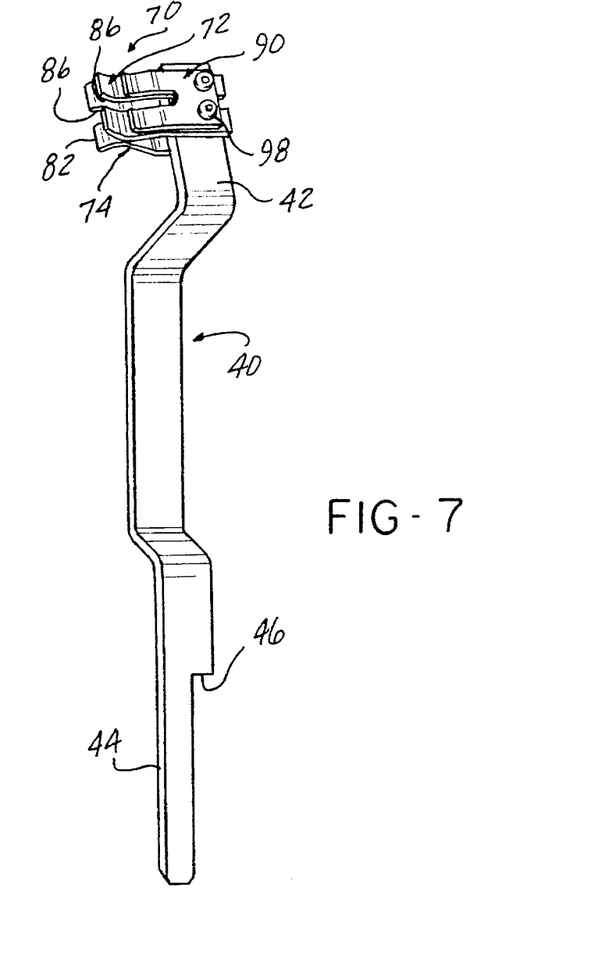
FIG. 7 is a perspective view of an electrical conductor and jaw contact employed in the S to B watthour meter socket adapter shown in FIG. 5.
Figure 8:
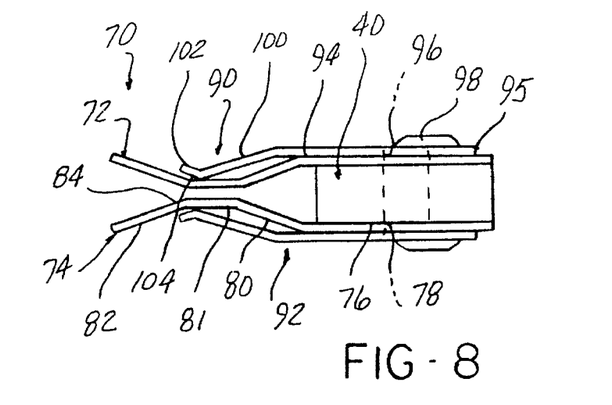
FIG. 8 is an enlarged, end elevational view of the jaw contact shown in FIG. 7.

As shown in FIG. 5, and in greater detail in FIGS. 6, 7 and 8, a plurality of electrical conductors, each denoted generally by reference number 40, are disposed within the socket adapter 10. Each conductor 40 is identically constructed, except for a slightly different preformed shape to provide appropriate routing and electrical insulation space between adjacent conductors within the socket adapter 10.

Preferably, each electrical conductor 40 is in the form of a rigid electrical conductor, such as a bus bar. Generally, each conductor 40 has a polygonal cross section, i.e., rectangular, square, etc., with a rectangular cross section being preferred and depicted in FIGS. 5–9 and 11. Each conductor 40 is bent into predetermined angular sections, as shown in FIGS. 5 and 7, so as to be spaced from adjacent conductors 40 by a sufficient distance to prevent any flash or spark from passing therebetween. This eliminates the need for electrical insulation on the exterior of the bus bar type electrical conductors 40. However, it will be understood that exterior electrical insulation may be utilized depending upon particular application requirements.

Each conductor 40 includes a first jaw contact end 42 and a second, opposed end 44 which is adapted to be inserted into electrical connection with a terminal mounted in a watthour meter socket.

Figure 9:
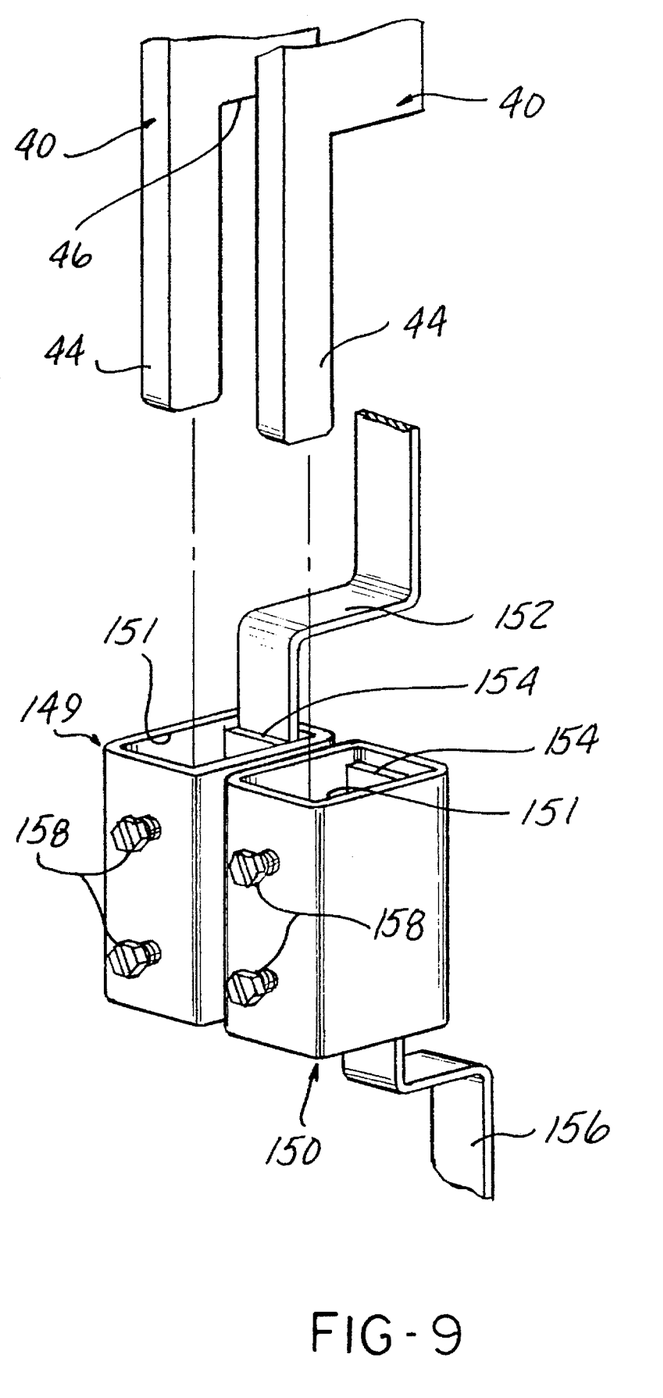
FIG. 9 is a perspective view showing the mounting of a conductor of the present watthour meter socket adapter in a terminal in a "B" type watthour meter socket.

Each conductor 40 is arranged in the socket adapter 10 with its longest dimension oriented in alignment with the longest cross sectional dimension of the blade terminals of a watthour meter which is attachable to the socket adapter 10. As shown in FIGS. 6, 7, 9 and 11 each conductor 40 is provided with a step or shoulder 46 which forms a stepped down, reduced cross section second end 44 which easily fits within one of the terminals in the watthour meter socket as shown in FIG. 9.

Two terminals 149 and 150 fixedly mounted in a watthour meter socket are depicted in FIG. 9. Both terminals 149 and 150 have a rectangular or square through bore 151; although a circular bore is also employed in some watthour meter sockets. A preformed lead 152 is mounted in the terminal 149 behind a contact plate 154 and connected to a stranded wire electrical line conductor by a conventional connector, not shown. A second lead 156 is mounted in the terminal 150 behind a contact plate 154 and connected to an electrical load conductor, not shown.

Two fasteners 158 are threadable through apertures in one wall of each terminal 149 and 150 to securely connect the second end 44 of individual conductors 40 to the terminals 149 and 150. The smaller cross sectioned second end 44 of each conductor 40 extending from the step or shoulder 46 is easily insertable into either terminal 149 or 150 regardless of whether the terminal 149 or 150 has a square, rectangular or circular bore 151. However, the larger cross section portion of the conductor 40 extending oppositely from the step or shoulder 46 provides increased current carrying capability for the socket adapter 10 over prior art S to B socket adapters or socket arrangements described above.

According to the present invention, an insulating sleeve denoted generally by reference number 50 and shown in FIGS. 4, 5, 6 and 11, is mounted in the socket adapter 10 for covering exposed portions of the conductors 40 extending outward from the shell 14 of the socket adapter 10. The insulating sleeve 50 is formed of a suitable electrically insulating material, such as mylar or, preferably, a fire retardant polycarbonate, and has opposed front and back walls 52 and 54 and opposed side walls 53 and 55 which are secured in position within the shell 14 by attachment to certain of the fasteners 16. One end of the front wall 52, the back wall 54 and the side walls 53 and 55 are closed by an end wall 56. The end wall 56 includes a plurality of spaced apertures 57, each of which receives the second end 44 of one of the conductors 40 therethrough.

As shown in FIGS. 4, 5 and 6, and in greater detail in FIGS. 7 and 8, a jaw contact denoted generally by reference number 70 is mounted on the first end 42 of each conductor 40.

Each jaw contact 70 is formed of first and second separate, contact clips 72 and 74 which are mounted on opposite sides of the major surfaces of the first end 42 of each conductor 40. As shown in FIGS. 7 and 8, each of the first and second contact clips 72 and 74 is formed with a first, generally planar, flat end portion 76 having at least one and preferably two apertures 78 formed therein. The apertures 78 are alienable with corresponding apertures formed in the first end 42 of each conductor 40.

A first intermediate portion 80 is formed on each contact clip, such as contact clip 74, and disposed at a predetermined angle from the end portion 76. The first intermediate portion 80 is bent out of the plane containing the flat end portion 76 generally at an angle of approximately 15° with respect to the plane containing the end portion 76. A second intermediate portion 81 is disposed at an angle of approximately 5° with respect to the plane containing the end portion 76. Each contact clip, such as contact clip 74, terminates in an outer end portion 82 which is disposed at an angle substantially 15° or less with respect to a plane extending through a blade terminal contact point 84 formed between the end portion 82 and the intermediate portion 81 and lying generally parallel to the plane containing the end portion 76 of the contact clip 74.

As shown in FIG. 7, a slot 86 is formed in each contact clip 72 and 74 and extends from the outer end portion 82 to a closed end approximate the flat end portion 76. The divides 86 divide the end portion of each contact clip 72 and 74 into two finger-like contact portions.

Means are provided for biasing each contact clip 72 and 74 toward each other with sufficient force to releasibly and securely hold a blade terminal of a watthour meter or other electrical device therebetween in a secure electrical connection. The biasing means preferably comprises first and second spring clips 90 and 92, respectively. One spring clip 90 or 92 is provided for each contact clip 72 or 74, respectively. Each spring clip 90 and 92 is formed of a suitable biasing material, such as SAE1060 spring steel, which is heat treated to 42–44Rc and then coated with a corrosion resistant material such as zinc.

As shown in FIGS. 7 and 8, each spring clip, such as spring clip 90, is formed with a flat, central portion 94. At least one and preferably a pair of apertures 96 are formed through the juncture of the central portion 94 and an angled first end 95 and alienable with the apertures 78 in the contact clips 72 and 74 and the bores in the first end 42 of the conductor 40. Rivets 98 are mountable through the aligned apertures to fixedly connect the spring clips 90 and 92 and the contact clips 72 and 74 to the first end 42 of each conductor 40.

The first end 95 of each spring clip, such as spring clip 90, is bent or otherwise formed at a predetermined angle from the central portion 94. In a preferred embodiment, the first end 95 is initially formed at an angle of approximately 15° from the central portion 94. When the spring clip 90 is mounted in engagement with the contact clip 72, the first end 95 first engages the flat end portion 76 of the contact clip 72. The central portion 94 of the spring clip 90 will initially be spaced from the contact clip 72 until the rivet 98 forcibly urges and deforms the first end 95 of the spring clip 90 into engagement with the contact clip 72 bringing the central portion 94 of the spring clip 90 into registry with the flat end portion 76 of the contact clip 72. This increases the biasing force exerted on the first end 95 of the spring clip 90 and on the opposed spring clip 92 to form a secure connection between the contact clips 72 and 74 and the mating first end 42 of the conductor 40 inserted therebetween.

Each spring clip 90 and 92 further includes a second intermediate angled portion 100 which extends from an opposite end of the central portion 94. The second angled portion 100 is also disposed at a predetermined angle from the plane containing the central portion 94. Preferably, this angle is substantially 15° from the plane containing the central portion 94. Finally, each spring clip, such as spring clip 90, is formed with an angularly disposed second end portion 102 which is disposed at an angle of approximately 30° from the point 104 juncture of the second end portion 102 and the second angled portion 100. This juncture point 104 forms a contact point in which the spring clip 90 forcibly engages the contact clip 72.

As noted above, the mounting of the rivets 98 through the aligned apertures in the contact clips 72, 74, the spring clips 90, 92 and the first end 42 of the conductor 40 deforms the spring clips 90 and 92 into forced engagement with the contact clips 72 and 74. This increases the closure force urging the contact clips 72 and 74 together so as to enable the contact clips 72 and 74 to form a secure connection with a blade terminal of an electrical device, such as a watthour meter, inserted therebetween.

Further, details concerning the construction and use of the jaw contacts 70 may be had by referring to copending U.S. patent applications, Ser. Nos. 08/215,915 and 08/216,261, the relevant portions of which are incorporated herein by reference.

Means are provided in the socket adapter 10 for positioning each jaw contact 70 at a standard watthour meter contact mounting position for receiving a blade terminal of a watthour meter in a snap-in connection. The positioning means primarily comprises an electrically insulating plate 110 shown in FIGS. 4, 5 and 6 which is attached to and spaced from the base 12 by the fasteners 16 and mounting posts 112 formed on and extending outward from the base 12 into the recess formed within the annular side wall 18 of the shell 14. As shown in FIG. 6, this spacing forms an interior cavity in which the conductors 40 are movably disposed. Apertures 111 are formed in the mounting plate 110 at the conventional jaw contact mounting positions and receive outer end portions of the jaw contacts 70 therethrough. The apertures 111 positions the jaw contacts 70 at the standard position for receiving a blade terminal of a watthour meter therein as well as retaining the conductors 40 in position within the socket adapter 10. As noted above, the conductors 40 are also retained in the desired mounting position within the socket adapter 10 by the apertures 57 in the end wall 56 of the insulating sleeve 50.

The conductors 40 and jaw contacts 70 are non-attachedly mounted between the insulating plate 110 and the base 12. This enables the jaw contacts 70 to float or exhibit a slight amount of free movement within the apertures 111 in the insulating plate 110 for self-alignment with the blade terminals of a watthour meter. This reduces the cost of the present socket adapter 10 since less precise manufacturing tolerances need be achieved. However, it will be understood that the conductors 40 could also be individually fastened in place on the base 12.

A separate aperture is also formed in the insulating plate 110 for receiving a ground jaw contact 114, as shown in FIGS. 4, 5 and 6. The ground jaw contact 114 may have any suitable shape such as that shown in FIGS. 4, 5 and 6, or the shape shown in FIG. 30 of pending U.S. applications Ser. Nos. 08/215,915 and 08/216,261 already incorporated herein by reference.

In addition, an aperture 116 formed substantially centrally in the mounting plate 110 forms an opening through which the ground conductors 28 pass to an internal connection behind the insulating plate 110 to the ground jaw contact 114.

The insulating plate 110 also serves as a dead front as it covers the non-insulated conductors 40 and a substantial portion of the jaw contacts 70. This feature provides additional safety for the meter installer.

Figure 10:
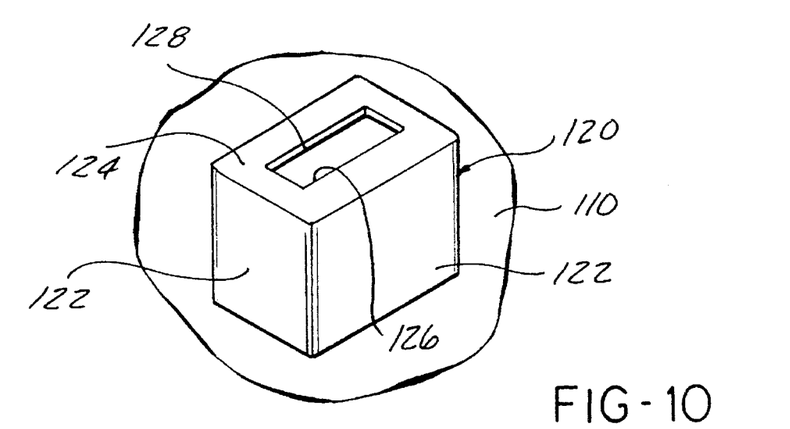
FIG. 10 is a partial, enlarged, perspective view of a shielding receptacle optionally formed on the insulating plate shown in FIGS. 4 and 5.

In addition, as shown in FIG. 10, a raised pocket or receptacle 120 can be formed in and extending outwardly from the insulating plate 110 away from the base 12. The receptacle 120 includes raised side walls 122 which terminate in an outer end 124. An aperture or slot 126 is formed in the outer end 124, preferably with inwardly beveled edges 128. The interior of the receptacle 120 is hollow to define a chamber for receiving and surrounding a jaw contact 70. The receptacle 120 thus forms an electrically insulating shield around the jaw contact 70, with the narrow slot 126 provided access for a blade terminal of a watthour meter to be inserted into electrical connection with the jaw contact.

As shown in FIG. 5, two electrically insulating shields 117 and 119 are loosely or fixedly disposed within the cavity between the insulating plate 110 and the base 12. The shield 117 surrounds one upper disposed jaw contact 70 to insulate the jaw contact 70 and the attached first end 42 of the conductor 40 from the fastener 16 which is grounded. The other shield 119 is disposed about one lower positioned jaw contact 70 and conductor 40 to electrically insulate two adjacent jaw contacts 70 and conductors 40 which are at two different phases.

As shown in FIGS. 4 and 5, three pairs of conductors 40 are mounted in the socket adapter 10. The three pairs of conductors 40 provide standard L1, L2 and neutral single phase connections. It will be understood that additional conductors may be provided to form a three phase S to B type watthour meter socket adapter incorporating the features of the present invention.

Figure 11:
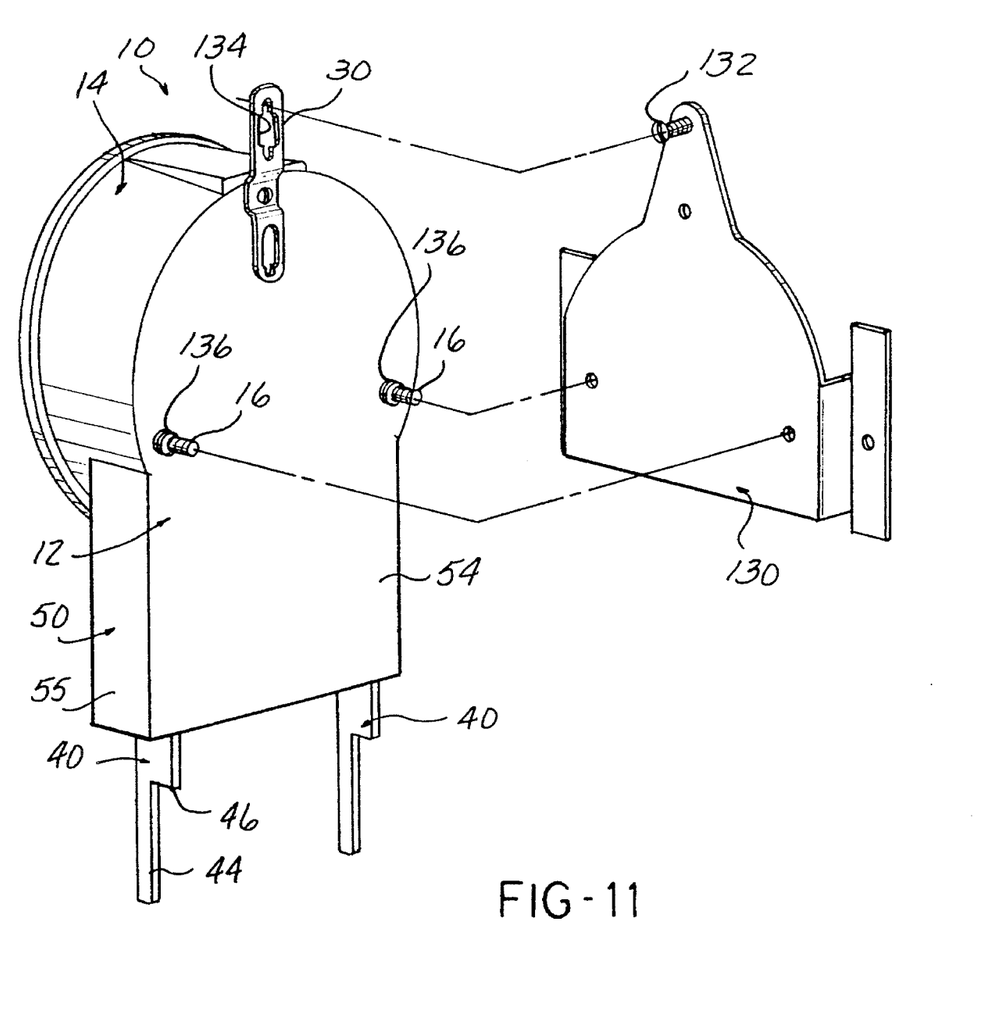
FIG. 11 is an exploded, perspective view showing the mounting of the present watthour meter socket adapter on a mounting plate in a watthour meter socket.

FIG. 11 depicts the disconnected position of the watthour meter socket adapter 10 on a mounting plate 130 in a watthour meter socket. A mounting member 132, such as a threaded screw, extends outward from the mounting plate 130 and engages the hanger 30 on the base 12 of the socket adapter 10 by insertion through aperture 134 in the hanger 30. In this position, the legs of the hanger 30 mount the top end of the base 12 of the socket adapter 10 flush against the mounting plate 130. However, the outward extent of the head of the fasteners 16 from the back surface of the base 12, even with a conventional single lock washer, is less than the distance of the offset legs of the hanger 30 from the base 12 such that the bottom edge of the socket adapter 10 could exhibit a slight amount of movement relative to the mounting plate 130. This results in a gap between the mounting flange 20 on the socket adapter 10 and the edges surrounding the aperture in the cover of the watthour meter socket. Such a gap could provide an opportunity for tampering with the assembly to divert unmetered power from the socket.

To prevent such tampering, spacer means 136, such as a number of washers or a specific length spacer, are mounted about each lowermost fastener 16 between the head of each fastener 16 and the base 12. The number of washers or the length of the spacer is selected to enable the heads of the fasteners 16 to engage the mounting plate 130 of the socket adapter 10 and position the base 12 generally parallel to the mounting plate 130 so as to place the mounting flange 20 in registry with the edges of the aperture in the cover of the watthour meter socket to prevent any gap or space therebetween. This decreases the possibility of tampering with the watthour meter socket adapter 10 to unauthorizedly tap non-metered electric power from the watthour meter socket.

In summary, there has been disclosed a unique watthour meter socket adapter which provides significant advantages over previously devised S to B watthour meter socket adapters or socket constructions. The use of rigid bus bar type conductors enables higher currents to be provided in an existing meter socket without modifications to the watthour meter socket. Further, even though the conductors have a polygonal, i.e., rectangular, cross section, the ends of the conductors still fit within the openings in the terminals in a conventional watthour meter socket. The electrical conductors in the present watthour meter socket adapter freely float within the socket adapter housing thereby eliminating any labor required to fixedly mount the conductors to the socket adapter housing as needed in previously devised S to B watthour meter socket constructions. The watthour meter socket adapter of the present invention also enables the now standard S-type plug-in watthour meter to be inserted in a B-type watthour meter socket. Finally, the S to B type watthour meter socket adapter of the present invention is uniquely designed to enable a watthour meter to be tested separate from the watthour meter socket by standard test procedures. This eliminates the need for the extensive labor required with previously devised S to B type watthour meter socket assemblies to connect and bring out the watthour meter potential test terminals to a convenient location.

What is claimed is:

1. A watthour meter socket adapter for mounting a watthour meter having a plurality of outwardly extending blade terminals in a watthour meter socket including a plurality of terminals connected to electrical power line and load conductors, the watthour meter socket adapter comprising:

a housing having a base and an annular sidewall extending from the base and terminating in a watthour meter mounting flange;

a plurality of rigid electrical conductors disposed within the housing, each electrical conductor having first and second ends;

an electrical contact mounted on the first end of each electrical conductor for receiving one blade terminal of a watthour meter therein, each electrical contact including:

first and second spaced contact clips disposed in registry with each electrical conductor;

biasing means, engageable with each of the first and second contact clips, for biasing an end of each of the first and second contact clips toward each other; and means for fixedly joining the first and second contact clips and the biasing means to the electrical conductors;

an aperture formed in the sidewall; and a portion of each electrical conductor and the second end of each electrical conductor extending through the aperture externally from the housing for electrical connection of the second end of each electrical conductor to one terminal in a watthour meter socket.

2. The watthour meter socket adapter of claim wherein:

each electrical conductor has a step spaced from the second end to form the second end with a reduced cross section relative to the larger cross section of a remainder of each electrical conductor.

3. The watthour meter socket adapter of claim 1 wherein:

each of the first and second contact clips comprises:

a first, planar end portion; and a second jaw portion integral and continuous with the first end portion and bending in a first direction from the first end portion and then in a second direction toward a plane containing the first end portion.

4. The watthour meter socket adapter of claim 1 further comprising:

electrically insulating sleeve means, mounted to the housing and communicating with the aperture in the sidewall, for electrically insulating the portions of the electrical conductors extending through the aperture, the second ends of the electrical conductors extending externally of the sleeve means.

5. The watthour meter socket adapter of claim wherein the sleeve means comprises:

an enclosure having an interior space and an end wall; and aperture means, formed in the end wall, for receiving and positioning the second ends of the electrical conductors extending therethrough.

6. The watthour meter socket adapter of claim 1 wherein:

each electrical conductor has a polygonal cross section.

7. The watthour meter socket adapter of claim 6 wherein:

each electrical conductor has a rectangular cross section.

8. The watthour meter socket adapter of claim 1 wherein:

the electrical conductors are non-attachedly disposed within the housing of the socket adapter.

9. The watthour meter socket adapter of claim 8 further comprising:

means for positioning the electrical contact formed on the first end of each electrical conductor to receive a blade terminal of a watthour meter in a snap-in connection.

10. The watthour meter socket adapter of claim 9 wherein:

each electrical conductor has a step spaced from the second end to form the second end with a reduced cross section relative to the larger cross section of a remainder of each electrical conductor.

11. The watthour meter socket adapter of claim 9 wherein the positioning means comprises:

an electrically insulating plate fixedly mounted in the housing of the watthour meter socket adapter and spaced from the base to define a cavity in which the electrical conductors are disposed; and a plurality of apertures formed in the insulating plate, each aperture receiving one electrical contact of one electrical conductor therethrough.

12. The watthour meter socket adapter of claim 11 wherein the positioning means further comprises:

electrically insulating sleeve means, attached to the housing and communicating with the aperture in the sidewall, for electrically insulating the portions of the electrical conductors extending through the aperture in the sidewall, the second ends of the electrical conductors extending externally of the sleeve means.

13. The watthour meter socket adapter of claim 12 wherein the sleeve means comprises:

an enclosure having an interior space and an end wall; and aperture means, formed in the end wall, for receiving and positioning the second ends of the electrical conductors extending therethrough.

14. The watthour meter socket adapter of claim 11 further comprising:

a plurality of hollow receptacles formed in and extending outward from the insulating plate;

the interior of the receptacles opening to the cavity between the base and the insulating plate;

one of the electrical contacts being disposed in each receptacle; and an aperture formed in each receptacle for receiving a terminal of a watthour meter therethrough into electrical contact with the electrical contact disposed within the receptacle.

15. The watthour meter socket adapter of claim 14 wherein:

each electrical contact is loosely disposed in a receptacle.

16. The watthour meter socket adapter of claim 14 wherein each receptacle comprises:

a side wall extending from the insulating plate and terminating in an outer end wall;

the aperture being formed in the end wall.

17. The watthour meter socket adapter of claim 16 wherein:

at least certain edges of the end wall surrounding the aperture tapering inward from an exterior surface of the end wall toward the aperture.

18. The watthour meter socket adapter of claim 1 further comprising:

at least one ground surge plate mounted on the watthour meter mounting flange of the housing;

an electrical conductor connected to the at least one ground surge plate at one end and to a ground contact in the housing receiving a ground terminal of a watthour meter; and a pin mounted in and extending through the sidewall of the housing and having an outer end disposed externally of the housing for connection to ground in a watthour meter socket, the pin electrically connected to the conductor and the at least one ground surge plate.

19. The watthour meter socket adapter of claim 18 wherein the at least one ground surge plate comprises:

a first leg mounted over the watthour meter mounting flange on the housing, and a second leg depending from the first leg and overlaying the annular side wall of the housing and disposed within the watthour meter receiving portion of the housing.

20. The watthour meter socket adapter of claim 18 wherein:

the pin is releasibly connectible to a plug-in connector attached to ground in a watthour meter socket.

21. The watthour meter socket adapter of claim 18 further comprising:

another ground surge plate mounted on the mounting flange of the housing and spaced from the at least one ground surge plate; and an electrical conductor connected to the another ground surge plate at one end and to the common ground contact in the housing receiving a ground terminal of a watthour meter.

22. The watthour meter socket adapter of claim 1 wherein the first and second contact clips each comprise:

a plate-like member having a planar first end portion, an intermediate portion extending at a predetermined angle from the plane containing the first end portion; and a second end portion extending at a predetermined angle from an end of the intermediate portion.

23. The watthour meter socket adapter of claim 22 wherein:

a conductor contacting edge is formed at the juncture of an end of the intermediate portion and the second end portion of each of the first and second contact clips.

24. The watthour meter socket adapter of claim 22 wherein:

the second end portion extends at an angle less than or equal to substantially 15° from a plane extending parallel to a plane containing the first end portion and through the juncture of the end of the intermediate portion and the second end portion of each of the first and second contact clips.

25. The watthour meter socket adapter of claim 1 wherein the biasing means comprises:

first and second spring clips, respectively disposed in registry with the first and second contact clips.

26. The watthour meter socket adapter of claim 25 wherein:

a slot is formed in each of the first and second spring clips extending from the second end portion to the central portion and dividing the second end and the intermediate portions into two spaced portions.

27. The watthour meter socket adapter of claim 25 wherein the joining means comprises:

aligned apertures formed in the second end of the electrical conductor, the first and second spring clips and the first and second contact clips;

rivets fixedly mounted in the aligned apertures to force the central portion and the first end portion of the first and second spring clips into substantial registry with the first and second contact clips, respectively, and the first and second contact clips into registry with opposed surfaces of the second end of the electrical conductor to forcibly bias the first and second spring clips into engagement with the first and second contact clips, respectively, to urge the second end portions of the first and second contact clips toward each other.

28. The watthour meter socket adapter of claim 25 further comprising:

means for joining the first and second spring clips and the first and second contact clips, respectively, to the first end of each conductor.

29. The watthour meter socket adapter of claim 25 wherein the first and second contact clips each comprise:

a plate-like member having:

a planar central portion;

a first end portion extending at a predetermined angle from one end of the central portion;

an intermediate portion extending at a predetermined angle from an opposite end of the central portion in the same direction away from a plane containing the central portion as the first end portion; and a second end portion extending at a predetermined angle from an end of the intermediate portion toward the plane containing the central portion.

30. The watthour meter socket adapter of claim 29 wherein the first end portion is at a substantially 15° angle with respect to the central portion.

31. The watthour meter socket adapter of claim 30 wherein the intermediate portion is at a substantially 15° angle from the central portion.

32. The watthour meter socket adapter of claim 31 wherein the second end portion is at a substantially 30° angle from the end of the intermediate portion.

\* \* \* \* \*